July 15, 1952 C. L. PELHAM 2,603,052
MULTIPLE SICKLE MOWING UNIT
Filed March 2, 1948 4 Sheets-Sheet 1
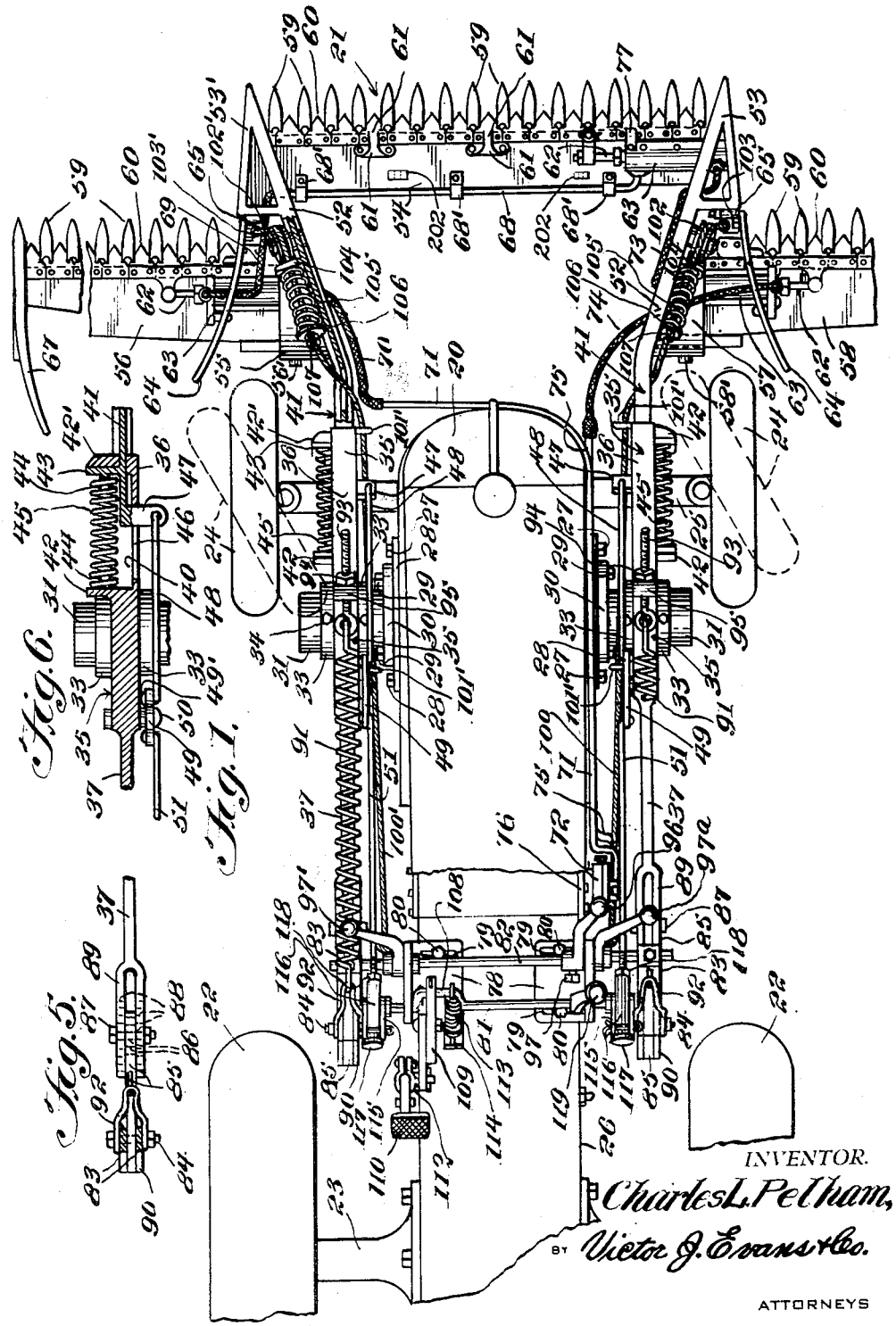
INVENTOR.
Charles L. Pelham,
BY Victor J. Evans & Co.
ATTORNEYS July 15, 1952 C. L. PELHAM 2,603,052
MULTIPLE SICKLE MOWING UNIT
Filed March 2, 1948 4 Sheets-Sheet 2
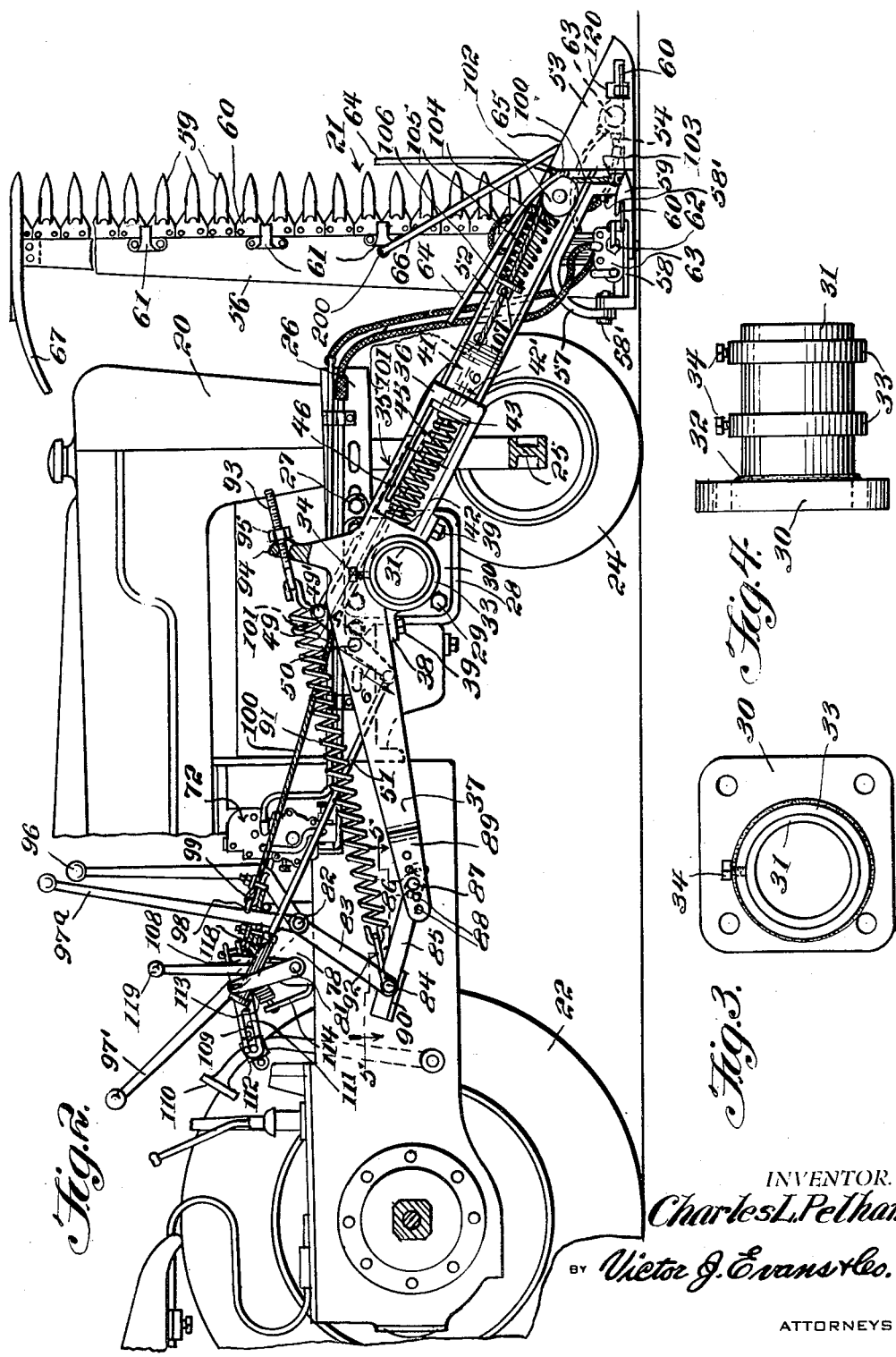
INVENTOR.
Charles L. Pelham,
BY Victor J. Evans & Co.
ATTORNEYS July 15, 1952　　　　　　　　C. L. PELHAM　　　　　　　　2,603,052
MULTIPLE SICKLE MOWING UNIT
Filed March 2, 1948　　　　　　　　　　　　　　　　4 Sheets-Sheet 3
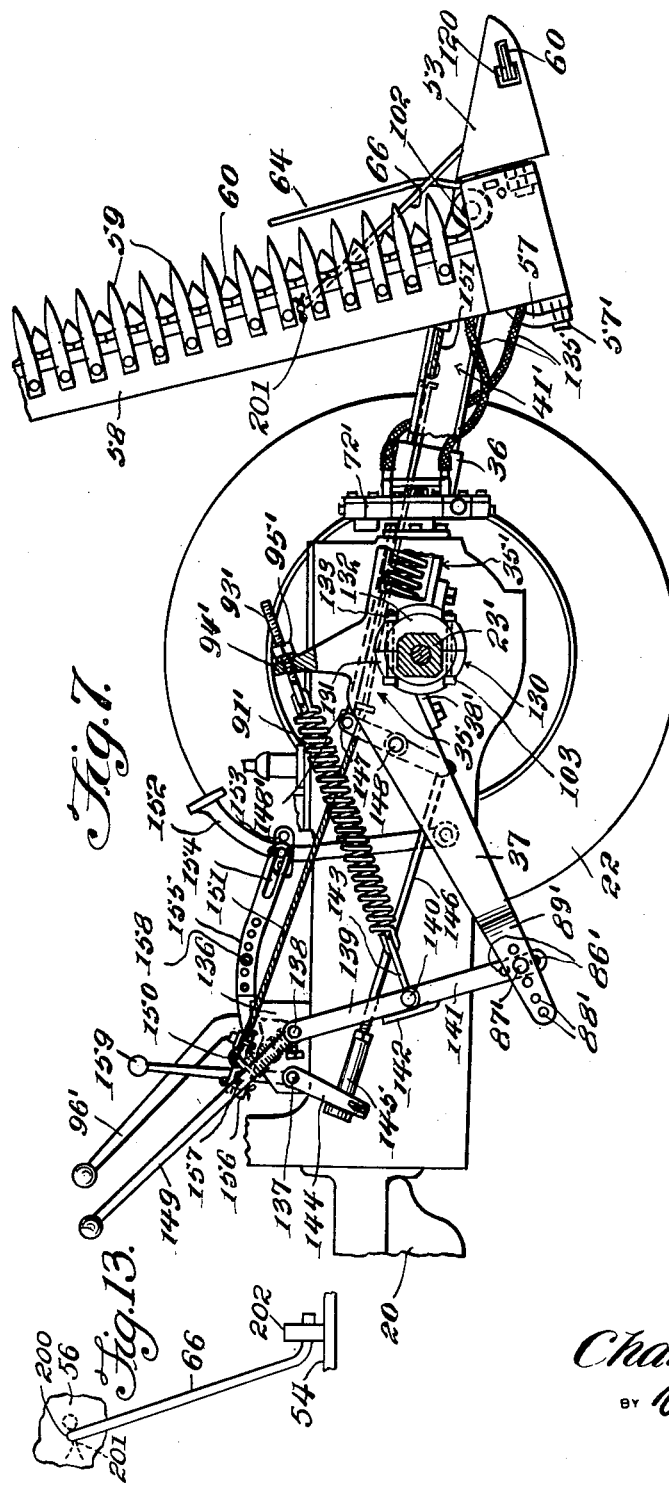
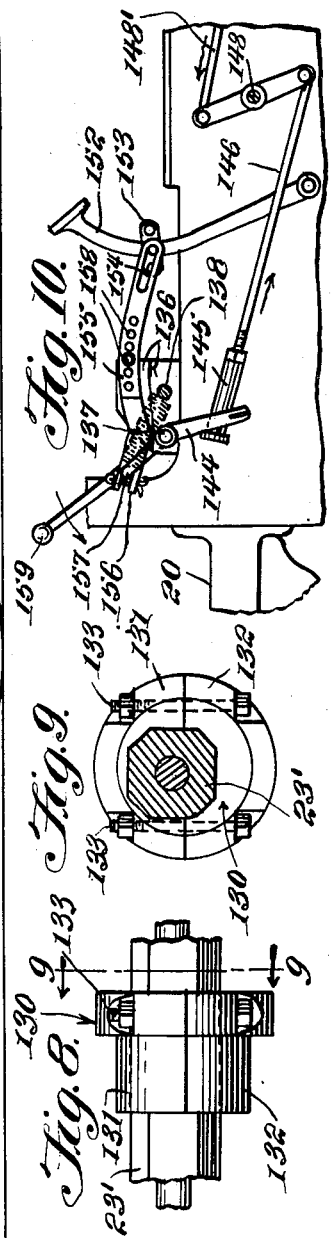
INVENTOR.
Charles L. Pelham,
BY Victor J. Evans & Co.
ATTORNEYS

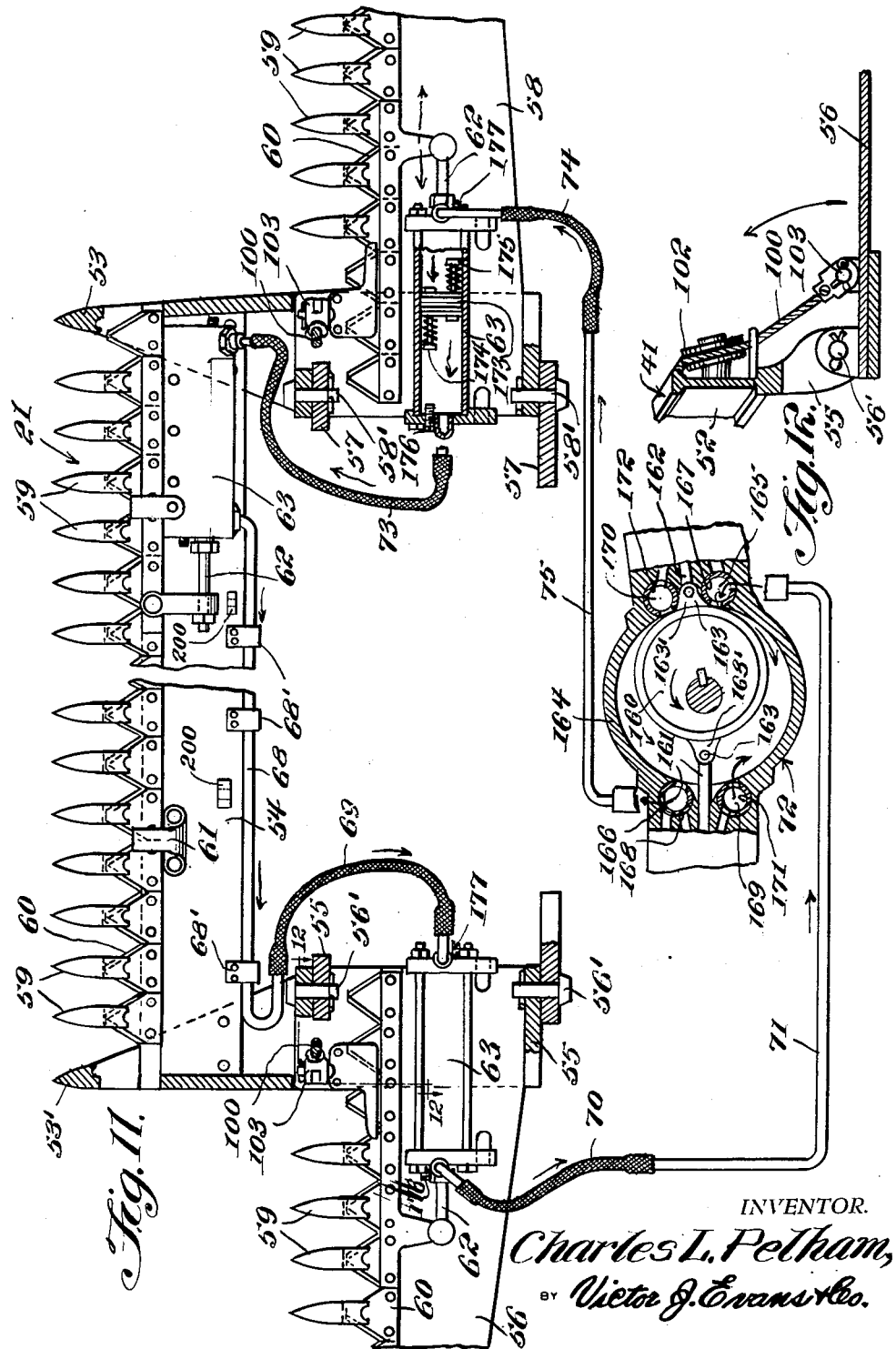

Patented July 15, 1952

2,603,052

UNITED STATES PATENT OFFICE 2,603,052

MULTIPLE SICKLE MOWING UNIT

Charles L. Pelham, Los Angeles, Calif.

Application March 2, 1948, Serial No. 12,492

2 Claims. (Cl. 56—25)

This invention relates to improvements in harvesting machinery, and more particularly to a multiple sickle mowing unit.

An object of the invention is to provide a multiple sickle mowing unit that is adapted for front or rear end mounting on tractors that are so equipped.

Another object of the invention is to provide a unit of this character that will increase capacity and eliminate side draft due to the provision of carrying frames in which multiple sickles are mounted, said frames being arranged symmetrically about and attached to a single tractor.

The proposed structure eliminates the conventional use of a cart or the like, which is employed for the second sickle, the car having an offset tongue to place the second sickle beyond the end of the first sickle on the same side of the tractor, thus increasing side draft and interfering with the maneuverability of the tractor.

A further object of the invention is to provide a unit of the character described, wherein the unit minimizes the drag of the cutter bars, and facilitates the lifting of the cutter bars by the use of a system of spring loaded balances.

A further object of the invention is to provide a unit of the character described, which enables the tractor to cut back and forth from one side of a field, giving better recovery of wind blown crops and permitting the recovery of crops close to fences, ditches or similar obstructions.

A still further object of the invention is to provide a unit of the character described, which will permit vertical adjustment of the cutter bars and yet maintain the cutter bars in a level position from the front to the back of the cutter bars.

A still further object of the invention is to provide a unit of the character described, which possesses a greater safety of operation by the use of a clutch release and cutter release that are actuated by overload conditions.

Further objects of the invention are to provide a unit of the character described that improves the utilization of power while minimizing vibration by the application of power parallel to sickle travel at all times, to provide a greater range of adaptation of the machine, and to eliminate running over cut crops by the tractor wheels.

With the above and other objects and advantages in view, the invention consists of the novel details of construction, arrangement and combination of parts more fully hereinafter described, claimed and illustrated in the accompanying drawings in which:

Figure 1 is a plan view partly broken away showing the manner of attaching an embodiment of the invention to the front axle of a tractor;

Figure 2 is a side elevation of the tractor and unit mounted therein with one sickle vertically positioned;

Figure 3 is an elevational face view of the eccentric mounting for adjusting the cutters in relation to the ground;

Figure 4 is a side elevational view of Figure 3;

Figure 5 is a sectional view on the line 5—5 of Figure 2;

Figure 6 is a sectional plan taken through the frame substantially on line 6—6 of Figure 2 and showing the part of the frame on the opposite side of the tractor from that shown in Figure 2, said section also having parts broken away and parts omitted;

Figure 7 is a modified elevational view, partly in section, showing the unit mounted on the rear axle of a tractor;

Figure 8 is a side elevational view of the eccentric mounting or rear axle bearing for mounting the cutter bar arms;

Figure 9 is a sectional view on the line 9—9 of Figure 8;

Figure 10 is a detailed elevational view of the clutch control of Figure 7;

Figure 11 is a diagrammatic plan view showing the power mechanism or drive for the sickle bars, and Figure 12 is a detail showing a section through part of the frame connecting one of the cutter bars to the frame being taken on line 12—12 of Figure 11.

Figure 13 is a detail illustrating a rod for holding one of the hinged cutter bars to the stationary centrally positioned cutter bar with the hinged cutter bar in the upwardly extended position.

Referring more in detail to the drawings, the reference numeral 20 in Figures 1 to 6, inclusive, designates a tractor on the front end of which is mounted the multiple sickle mowing unit 21, embodying the invention.

The tractor is a conventional model, having the rear tractor wheels 22 mounted on the rear axle housing 23, the steering wheels 24 on the front axle 25 and both axles fixed to the frame 26.

Fixed to the frame 26, rearwardly of the front axle, by bolts 27, is a plate 28, to which is fixed by bolts 29, the plate 30 carrying the eccentrically mounted fulcrum mounting member 31. The member 31 is tubular in cross section, is welded at 32 to the plate 30, and is variable in length to conform with the various widths of tractors that are in use at the present time.

There are mounted on the member 31, for a purpose to be later described, the collars 33, which are slidable on the member 31 for adjustment, and are retained in place by set screws 34 carried by each collar.

Mounted at each side of the tractor on the member 31 is the cutter bar supporting arm 35. The arm 35 has the downwardly inclined forward portion 36 and the downwardly inclined rear portion 37. The arms 35 are retained on the member 31 at this angle, by the strap 38, which is fixed to the arm by bolts 39.

The forward end of each portion 36 of each arm 35 is provided with a recess 40, in which is slidably mounted the rear end of the shoe or extension 41 (more clearly shown in Figure 6).

The portion 36 has the oppositely disposed projections 42 and 42' respectively. The extension has the projection 43, which engages the projection 42' and the projection 42 on the portion 36 and the projections 43, on the extension 41, are each provided with a stud 44 which receives and retains in place therein, the shock absorbing spring 45.

The portion 36 also is provided with a slot 46 communicating with the recess 40, and through the slot 46, the projection 47 formed on the extension, extends to be connected to the rod 48. The rod 48, in turn, is connected to the pivoted arm 49 at 49', pivoted at 50 on the arm 35. The use of the rod 51 connected to the arm 49 will be later explained.

The extensions 41 each have the outwardly diverging inclined portions 52 on the outer ends of the extensions, and the portions are provided with triangular shaped shoes 53 and 53' respectively, which are fixed to the opposite ends of the center cutter bar 54.

A yoke 55, on the extension, carrying the shoe 53', has a side cutter bar 56 fixed thereto, while a yoke 57 on the extension carrying the shoe 53, has a side cutter bar 58 fixed thereto. Each cutter bar is adapted to pivot on its respective pivot pins 56' and 58' respectively, and each of the cutter bars is provided with the pointed guards or teeth 59. Each cutter bar carries a sickle or toothed cutting blade 60, which is retained in place by the clips or holddowns 61 fixed to each bar.

Each sickle 60 is connected to a piston rod 62, which is mounted in the actuating cylinder 63 fixed to each cutter bar. Each cylinder is mounted so that the sickle can be removed and replaced as desired. The swath rods 64 are hinged at 65 so that they can swing upwardly and forwardly to permit the cutter bars 56 and 58 to pivot on the pivot pins 56' and 58', so that when in raised position, as shown in Figure 2, the rods 66 may be used to retain the bars in this position. Openings 200 are provided in the hinged cutter bars to receive one of the ends of the rods 66 and cotter pins 201 retain these ends of the rods 66 in the openings 200, and the cutter bar 54 is provided with apertured lugs 202 which are relatively positioned with respect to the center of the bar 54, to receive the opposite ends of the rods 66. The rods are carried on the tractor when not in use. Outer shoes 67 are provided on the outer ends of the bars 56 and 58.

The cylinder 63 on the cutter bar 54, is connected by the rigid pipe 68 and flexible hose 69, to the cylinder 63 on the cutter bar 56. The latter cylinder is connected by a flexible hose 70 to the rigid pipe 71, which is connected to the pump 72 fixed to the tractor frame. The cylinder 63, on the cutter bar 54, is connected by a flexible hose 73 to the cylinder 63 on the cutter bar 58, and the latter cylinder is connected by a flexible hose 74 to the rigid pipe 75, also connected to the pump 72. The pump is operated by the power take-off 76 of the tractor to which it is connected.

The cylinders are thus connected in a manner to use a circulated fluid propellant, but each cylinder may be connected separately to use an exhausted fluid propellant, if desired. The cylinders are recessed into each cutter bar to minimize obstruction to the flow of crop over the cylinders, and one cylinder carries a clip 77 similar in all respects to the clips 61, as to the purpose for which they are used. The flexible hose permits the motion of parts as desired, the rigid pipe being used where there is lack of motion.

Fixed to the tractor frame, intermediate the driver's seat and motor, are the relatively spaced bearing brackets 78. The brackets, through the medium of elongated slots 79, coact with the bolts 80 by which the brackets are fixed to the tractor, permitting adjustment of the brackets to tractors of various widths.

The brackets journal therein the transverse parallel shafts 81 and 82 respectively. Fixed to the outer ends of the shaft 82, are the parallel spaced links 83, which are pivotally connected at 84 to the links 85. The link 85 has spaced openings 86 in its free end so that it can be selectively connected by a bolt 87 in the spaced opening 88 of the bifurcated end 89 of the portion 37 of the arms 35. Thus if the brackets 78 are mounted in relation to the fulcrums whereby the connecting point of the link 85 with the portion 37 is essential, the openings 86 and 88 will permit adjustment between these elements. The links 85, at their opposite ends, are provided with a stop 90, which prevents the links from moving too far forwardly under pressure of the balance spring 91. The spring 91 is connected at one end to the eye connection 92 carried by the bolt 84, and at the opposite end, to the screw eye 93, which is mounted in the arm 94 on the arm 35. When the nut 95 on the screw eye 93 is adjusted, the spring 91 will properly balance the arms 35. These connections are made so that as the leverage factors in the links 83 and 85 increase, the tension of the springs 91 decreases. Thus when the cutter bars are level with the bottom of the pivot wheels of the tractor, the springs practically support that weight of the unit which is not otherwise balanced, permitting the cutter bars to lightly skim the ground and follow the irregularities of the ground.

The hand lever 96 is fixed to the shaft 82 by the set screw 97. The lever 96 need only to travel a fraction of its moving radius in either direction to cause the combination of the spring tension, leverage and balancing factors of the mechanism to complete unaided the travel of the cutter bars to their full upper or lower limits. The movement is varied by the length of the levers and the adjustment of the spring tension to vary the leverage and balancing factors. The lever 96 will, therefore, when moved, cause the arms 35, as above described, to raise until the stop 90 engages the link 83. The unit will stay in raised position with the springs 91 at rest until the lever 96 is again moved forward to the position shown in Figure 2. The unit will stay in lowered position until the lever 96 is moved to start the sequence of operations above outlined.

Since the other two cutter bars are hinged on the pivots 56' and 58' respectively, they must be raised to vertical position, as shown in Figure 2, by levers loosely mounted on the shaft 82. The lever 97a has a hook 98 to receive the loop 99 in the cable 100 which passes through guide eye bolts 101, over the pulley 102, rotatably mounted on the extension 41, to be fed at 103 to the cutter bar 58. The lever 97' constructed in like manner to lever 97a, is connected to the cable 100' passing through guide eye bolts 101' over pulley 102' fixed at 103' to the cutter bar 56. Thus the movement of the levers 97a and 97' will raise each cutter bar independently of each other, and the cutter bar 54 or they may all be raised in conjunction with each other.

Fixed to the extension, above the pulleys 102 and 102' are the spring seats 104, which seat one end of the springs 105, sleeved on the cables 101 and 101'. The other end of the spring engages the tension regulators 106 sleeved on the cables and fixed thereto by set screws 107. The tension of the springs 105 is regulated by the regulators 106 when the cutter bars 56 and 58 are in vertical position, and secured in place by the rods 66. Thus when the cutters are in horizontal position, the springs will be compressed. The springs act as balance springs for the cutter bars.

In Figure 12, it will be seen that the pulley 102 is in angular relation to the extension shoe 53. This angularity is coordinated with the connection of the cables to the cutter bars, the height of the fulcrums for the arms 35 and the tension of the springs 105, so that the springs are at rest when the cutter bars are raised. Thus when the bar is lowered, the spring nearly sustains the weight of the bar, yet permits the bar to drop below level.

The shaft 81 is provided with a crank portion 108, which is connected by the sectional link 109 to the clutch pedal 110 of the tractor. The sections of the link 109 are curved in adjustable relation to each other by the bolt 109'. Each end of each section of the link 109 is slotted as at 111 for sliding movement on the coupling 112 carried by the clutch pedal and the crank portion 108 of the shaft 81. A spring 113 connected to the crank portion 108 and a bracket 114 holds the clutch pedal in disengaged position when the crank portion is just past dead center.

Rigidly fixed to the outer ends of the shaft 81, are the spaced arms 115, which carry intermediate thereof, the tubular bushings 116, which are adjustably mounted on the upper ends of the rods 51. The bushings each have a head 117 which prevents their sliding out of the arms 115. The length of the rods 51 in the bushings 116 is adjusted by the nuts 118 on the rods below the bushings 116.

With the connection to the extensions 41, through the rods 48, it will be seen that the springs 45 will resist working loads, but will compress when an obstruction is encountered or the cutter bars drag due to overload. When the extension compresses the springs 45, due to overload or obstruction, the rods 51 will cause the movement of the crank portion 108 of the shaft 81 to disengage the clutch pedal 110. The spring 113 furnishes the necessary pressure to disengage the clutch pedal 110, the spring 113 furnishing the necessary pressure to disengage the clutch when the rod 51 has moved the crank off dead center. The clutch may also be disengaged by foot pressure or by the hand lever 119 which is fixed to the shaft 81.

The slot 120 in shoe 53 permits the sickle for the bar 54 to be removed after clips 61 have been removed. The other sickles are removed after clips 61 have been removed by slightly rising the shoes associated with the cutter bars leaving the outer ends of bars 56 and 58 on the ground.

In Figures 7 to 10, inclusive, the unit is attached on the rear axle housing 23' of the tractor. In this instance, the eccentric fulcrum 130 is formed of sections 131 and 132 respectively, which are placed on the axle housing 23' and retained thereon by bolts 133. The arms 35' are then mounted on the fulcrums and retained in place by the strap 38'. The extensions 41' will then extend rearwardly of the tractor and the unit is the same as previously described. The pump 72' is mounted at the rear power take-off 134 of the tractor, and connected by flexible hose 135 to the cylinders 63 of the cutter bars.

The linkage for the control of the clutch pedal is somewhat different than for the unit when it is attached to the front of the tractor.

The brackets 136 for the shafts 137 and 138 are mounted similar, with the link 139 fixed to shaft 138 at one end and pivoted at 140 to the link 141, selectively connected to the bifurcated end 89' of the arm 35 by the openings 86' and 88' and bolt 87'. A stop 142 is provided on the link 141, and a connecting eye hanger 143 on the pivot 140 receiving one end of the spring 91', which is connected to the screw bolt 93' in the arm 94', the nut 95' on the bolt 93' adjusting the tension of the spring 91', as previously described.

The arms 144 carry the tubular housing 145 in which is adjustably mounted the rods 146 connected at one end to the link 147 pivoted at 148 on the arm, and in turn pivoted at the opposite end to the rod 148, which is similar to the rod 48. Shaft 138 is rotated by the lever 96' for the raising and lowering of the unit, and the levers 149 being connected by a hook 150 to the cable 151 which, in turn, is connected to the cutter bars, as are the cables 100 and 100'.

The clutch pedal 152 in this instance carries the coupling 153 which enters the slot 154 in the arcuate shaped link 155, which, at its slotted end 156, is connected to the crank portion 157 of the shaft 137. The link 155 is made in sections, so that by means of the openings 158 and a bolt passing through these openings and connecting the sections, the length of the link can be varied. A hand lever 159 on the shaft 137 also permits disengagement of the clutch pedal 152.

The units, except for their different points of mounting, operate exactly the same, so that further details of the operation of the unit mounted on the end is not deemed necessary. However, when mounted on the rear of the tractor, the tractor must be driven in reverse. This may be done with or without the aid of control reversing attachments now manufactured for tractors. Mounting of the device on the rear provides less side drag over crop on turns, provides better visibility of work area and places the weight of the unit on the larger rear tires and the more stable rear end of the tractor.

In Figure 11, a plan view or diagrammatic view of the power operating means is shown for the cutter bars. The tubing 68 is retained in fixed relation out of the way of the crop by straps 68' and with the cylinders 63 recessed into cutter bars, the crop will pass over these elements without interference.

The pump 72 is provided with the rotor 160, having sliding vanes 161 and 162, pivotally connected at 163 to followers 163' which engage the rotor, to divide the pump housing 164 into intake and compression chambers. The pipes 71 and 75 are connected to ports 165 and 166 respectively, which ports are controlled by sleeve valves 167 and 168 respectively. These ports are alternately connected to the different chambers in the housing for the inlet and outlet of the fluid propellant, the other ports 169 and 170 being also connected in alternate relation to the chambers and controlled by sleeve valves 171 and 172 respectively. Operation of the pump from the power take-off in conjunction with the sleeve valves will cause reciprocation of the sickles on the cutter bars. The cylinders 63 carrying the pistons 173 have the check valves 174 and 175, respectively, so that the stroke of the piston is controlled. Tappets 176 and 177 engage the valves 174 and 175 to maintain the sickles centered or registered in their strokes to permit the fluid propellant to pass through the pistons in the event an obstruction causes the sickles to jam.

The unit, by means of the cylinders and pump control, eliminates the use of pitman and crank, belts, universal joints and other items in use with sickles of the present day construction. The cutter bars are all spring balanced and easily controlled through the various levers described.

Greater flexibility of control is available in the unit described.

Compensation for obstructions met in the field are provided. The independent action of each cutter bar permits close cutting to obstructions.

It is believed that from the foregoing description, the construction of the unit will be apparent to those skilled in the art, and it is to be understood that changes in the minor details of construction, arrangement and combination of parts may be resorted to, provided they wall within the spirit of the invention and the scope of the appended claims.

Having thus described the invention, what is claimed as new and desired to be secured by Letters Patent is:

1. In a mowing machine, the combination which comprises a frame including a pair of arms having downwardly inclined portions, a transversely disposed cutter bar having spaced guards on the forward edge thereof carried by the arms of the frame, a reciprocable sickle bar slidably mounted on the cutter bar and having blades thereon positioned to co-act with the said guards, said sickle bar having an arm extended therefrom, a cylinder mounted on said cutter bar, spaced from and positioned parallel to the sickle bar, a piston having valve openings therethrough and a piston rod extended therefrom positioned in the cylinder, said piston rod extended through one end of the cylinder and connected to the arm extended from the sickle bar whereby pressure applied alternately to opposite ends of the cylinder reciprocates the sickle bar, and resiliently held oppositely disposed valves positioned in the openings through the piston whereby shock load resulting from a blade of the sickle bar striking an obstruction causes one of said valves to open relieving the operating pressure and temporarily stopping the operation of the sickle bar.

2. In a mowing machine, the combination which comprises a frame adapted to be mounted on a tractor, a transversely disposed center cutter bar having spaced guards on the forward edge thereof carried by the frame, laterally disposed side cutter bars also carried by the frame and extended from the sides thereof, said side cutter bars also having spaced guards on the forward edges, reciprocable cutter bars slidably mounted on the cutter bars and having blades thereon positioned to co-act with the said guards, said sickle bars having arms extending therefrom, cylinders mounted on said cutter bars, spaced from and positioned parallel to the sickle bars, pistons having valve openings therethrough and piston rods extended therefrom positioned in the cylinders, said piston rods extended through one of the ends of the cylinders and connected to the said arms extended from the sickle bars whereby pressure applied alternately to opposite ends of the cylinders reciprocates the sickle bars, resiliently held oppositely disposed valves positioned in the openings, through the pistons whereby shock loads resulting from a blade of a sickle bar engaging an obstruction causes one of the valves of the pistons to open relieving the operating pressure of the cylinder in which the piston is positioned and temporarily stopping the operation of the sickle bar, and tappets adjustably mounted in the ends of the cylinders aligned with and positioned to be engaged by the said valves in the piston whereby the valves are opened at the end of the stroke.

CHARLES L. PELHAM.

REFERENCES CITED

The following references are of record in the file of this patent:

UNITED STATES PATENTS

| Number | Name | Date |
|---|---|---|
| 551,925 | Elward | Dec. 24, 1895 |
| 1,164,827 | Lounsberry | Dec. 21, 1915 |
| 1,299,685 | Czaran | Apr. 8, 1919 |
| 1,528,553 | Kennedy et al. | Mar. 3, 1925 |
| 1,598,843 | Bauercamper | Sept. 7, 1926 |
| 1,860,247 | Horste | May 24, 1932 |
| 2,171,761 | Paradise et al. | Sept. 5, 1939 |
| 2,344,663 | Wood | Mar. 21, 1944 |
| 2,376,576 | Cross | May 22, 1945 |